US012792776B2

(12) United States Patent
Siohan et al.

(10) Patent No.: US 12,792,776 B2
(45) Date of Patent: *Nov. 10, 2026

(54) PRIVACY-AWARE MEETING ROOM TRANSCRIPTION FROM AUDIO-VISUAL STREAM

(71) Applicant: Google LLC, Mountain View, CA (US)

(72) Inventors: Olivier Siohan, Mountain View, CA (US); Takaki Makino, Mountain View, CA (US); Richard Rose, Mountain View, CA (US); Otavio Braga, Mountain View, CA (US); Hank Liao, New York, NY (US); Basilio Garcia Castillo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 19/041,148

(22) Filed: Jan. 30, 2025

(65) Prior Publication Data

US 2025/0173461 A1 May 29, 2025

Related U.S. Application Data

(63) Continuation of application No. 18/535,214, filed on Dec. 11, 2023, now Pat. No. 12,242,648, which is a (Continued)

(51) Int. Cl.

*G06F 21/62* (2013.01)
*G10L 17/02* (2013.01)
*H04L 12/18* (2006.01)

(52) U.S. Cl.

CPC .......... *G06F 21/6254* (2013.01); *G10L 17/02* (2013.01); *H04L 12/1831* (2013.01)

(58) Field of Classification Search

None

See application file for complete search history.

(56) References Cited

U.S. PATENT DOCUMENTS

| | | | |
|---|---|---|---|
| 9,396,354 | B1 | 7/2016 | Murphy et al. |
| 10,304,458 | B1 | 5/2019 | Woo |

(Continued)

FOREIGN PATENT DOCUMENTS

| | | | |
|---|---|---|---|
| CN | 103828349 | A | 5/2014 |
| JP | H1141578 | A | 2/1999 |

(Continued)

OTHER PUBLICATIONS

International Search Report and Written Opinion for the related Application No. PCT/US2019/062024, dated Jul. 21, 2020, 196 pages.

(Continued)

*Primary Examiner* — William J. Goodchild

(74) *Attorney, Agent, or Firm* — Honigman LLP; Brett A. Krueger; Grant Griffith

(57) ABSTRACT

A method for a privacy-aware transcription includes receiving audio-visual signal including audio data and image data for a speech environment and a privacy request from a participant in the speech environment where the privacy request indicates a privacy condition of the participant. The method further includes segmenting the audio data into a plurality of segments. For each segment, the method includes determining an identity of a speaker of a corresponding segment of the audio data based on the image data and determining whether the identity of the speaker of the corresponding segment includes the participant associated with the privacy condition. When the identity of the speaker of the corresponding segment includes the participant, the method includes applying the privacy condition to the corresponding segment. The method also includes process- (Continued)

ing the plurality of segments of the audio data to determine a transcript for the audio data.

20 Claims, 10 Drawing Sheets

Related U.S. Application Data continuation of application No. 17/755,892, filed as application No. PCT/US2019/062024 on Nov. 18, 2019, now Pat. No. 12,118,123.

(56) References Cited

U.S. PATENT DOCUMENTS 10,388,272 B1 8/2019 Thomson et al.
2007/0153091 A1* 7/2007 Watlington ........ H04N 21/4223 348/208.14
2010/0141655 A1* 6/2010 Belinsky ................ G11B 27/10 345/440
2014/0278425 A1* 9/2014 Jost ....................... G10L 15/063 704/257
2015/0220626 A1 8/2015 Carmi et al.
2016/0182580 A1* 6/2016 Nayak ................. H04L 65/4038 709/204
2016/0306788 A1* 10/2016 Avore ................... G06F 16/685
2019/0066686 A1* 2/2019 Baracaldo Angel ......................... G10L 21/0208
2019/0073998 A1 3/2019 Leblang et al.
2019/0341050 A1* 11/2019 Diamant .............. G06V 40/172
2020/0126583 A1* 4/2020 Pokharel ............. G10L 15/1822
2020/0349950 A1* 11/2020 Yoshioka ................ G10L 15/08
2021/0125615 A1* 4/2021 Medalion ................ G10L 15/26

FOREIGN PATENT DOCUMENTS

JP 2011-041578 A 3/2011
WO 2019/003395 A1 1/2019

OTHER PUBLICATIONS

Zhiwen Yu et al: "Smart meeting systems", ACM Computing Surveys, ACM, New York, NY, US, US, vol. 42, No. 2, Mar. 5, 2010 (Mar. 5, 2010), pp. 1-20, ISSN: 0360-0300, DOI: 10.1145/1667062.1667065, 20 pages.
Kazuhi Ro Otsuka et al: 1 "A real time multimodal system for analyzing group meetings by combining face pose tracking and speaker diarization" , Proceedings of the 10th International Conference on Multimodal Interfaces, IMCI 1 08, ACM Press, New York, New York, USA, Oct. 20, 2008 (Oct. 20, 2008), pp. 257-264, XP858092486, DOI: 10.1145/1452392.1452446 ISBN: 978-1-60558-198-9, p. 259, paragraph 3.-p. 261, paragraph 3.3; figure 1.
Japanese Office Action for the related Application No. 2022-528271, dated Aug. 4, 2023, 4 pages.
European Office Action for the related Application No. 26173024.6-1207 dated Jun. 15, 2026.

* cited by examiner

PRIVACY-AWARE MEETING ROOM TRANSCRIPTION FROM AUDIO-VISUAL STREAM

CROSS REFERENCE TO RELATED APPLICATIONS

This U.S. patent application is a continuation of, and claims priority under 35 U.S.C. § 120 from, U.S. patent application Ser. No. 18/535,214, filed on Dec. 11, 2023, which is a continuation of U.S. patent application Ser. No. 17/755,892, filed on May 11, 2022, which claims priority under 35 U.S.C. § 371 from PCT/US2019/062024, filed on Nov. 18, 2019. The disclosures of these prior applications are considered part of the disclosure of this application and are hereby incorporated by reference in their entireties.

TECHNICAL FIELD

This disclosure relates to privacy-aware meeting room transcription from an audio-visual stream.

BACKGROUND

Speaker diarization is the process of partitioning an input audio stream into homogenous segments according to speaker identity. In an environment with multiple speakers, speaker diarization answers the question "who is speaking when" and has a variety of applications including multimedia information retrieval, speaker turn analysis, and audio processing to name a few. In particular, speaker diarization systems are capable of producing speaker boundaries that have the potential to significantly improve acoustic speech recognition accuracy.

SUMMARY

One aspect of the disclosure provides a method for generating a privacy-aware meeting room transcript from a content stream. The method includes receiving, at data processing hardware, an audio-visual signal including audio data and image data. The audio data corresponds to speech utterances from a plurality of participants in a speech environment and the image data represents faces of the plurality of participants in the speech environment. The method also includes receiving, at the data processing hardware, a privacy request from a participant of the plurality of participants. The privacy request indicates a privacy condition associated with the participant in the speech environment. The method further includes segmenting, by the data processing hardware, the audio data into a plurality of segments. For each segment of the audio data, the method includes determining, by the data processing hardware, from among the plurality of participants, an identity of a speaker of a corresponding segment of the audio data based on the image data. For each segment of the audio data, the method also includes determining, by the data processing hardware, whether the identity of the speaker of the corresponding segment includes the participant associated with the privacy condition indicated by the received privacy request. When the identity of the speaker of the corresponding segment includes the participant, the method includes applying the privacy condition to the corresponding segment. The method further includes processing, by the data processing hardware, the plurality of segments of the audio data to determine a transcript for the audio data.

Implementations of the disclosure may include one or more of the following optional features. In some implementations, applying the privacy condition to the corresponding segment includes deleting the corresponding segment of the audio data after determining the transcript. Additionally or alternatively, applying the privacy condition to the corresponding segment may include augmenting a corresponding segment of the image data to visually conceal the identity of the speaker of the corresponding segment of the audio data.

In some examples, for each portion of the transcript that corresponds to one of the segments of the audio data applying the privacy condition, processing the plurality of segments of the audio data to determine the transcript for the audio data includes modifying the corresponding portion of the transcript to not include the identity of the speaker. Optionally, for each segment of the audio data applying the privacy condition, processing the plurality of segments of the audio data to determine the transcript for the audio data may include omitting transcribing the corresponding segment of the audio data. The privacy condition may include a content-specific condition, the content-specific condition indicating a type of content to exclude from the transcript.

In some configurations, determining, from among the plurality of participants, the identity of the speaker of the corresponding segment of the audio data includes determining a plurality of candidate identities for the speaker based on the image data. Here, for each candidate identity of the plurality of candidate identities, generating a confidence score indicating a likelihood that a face of a corresponding candidate identity based on the image data includes a speaking face of the corresponding segment of the audio data. In this configuration, the method includes selecting the identity of the speaker of the corresponding segment of the audio data as the candidate identity of the plurality of candidate identifies associated with the highest confidence score.

In some implementations, the data processing hardware resides on a device that is local to at least one participant of the plurality of participants. The image data may include high-definition video processed by the data processing hardware. Processing the plurality of segments of the audio data to determine a transcript for the audio data may include processing the image data to determine the transcript.

Another aspect of the disclosure provides a system for privacy-aware transcription. The system includes data processing hardware and memory hardware in communication with the data processing hardware. The memory hardware stores instructions that when executed on the data processing hardware cause the data processing hardware to perform operations. The operations include receiving an audio-visual signal including audio data and image data. The audio data corresponds to speech utterances from a plurality of participants in a speech environment and the image data represents faces of the plurality of participants in the speech environment. The operations also include receiving a privacy request from a participant of the plurality of participants, the privacy request indicating a privacy condition associated with the participant in the speech environment. The method further includes segmenting the audio data into a plurality of segments. For each segment of the audio data, the operations include determining from among the plurality of participants, an identity of a speaker of a corresponding segment of the audio data based on the image data. For each segment of the audio data, the operations also include determining whether the identity of the speaker of the corresponding segment includes the participant associated with the privacy condition indicated by the received privacy request. When the identity of the speaker of the corresponding segment includes the participant, the operations include applying the privacy condition to the corresponding segment. The operations further include processing the plurality of segments of the audio data to determine a transcript for the audio data.

This aspect may include one or more of the following optional features. In some examples, applying the privacy condition to the corresponding segment includes deleting the corresponding segment of the audio data after determining the transcript. Optionally, applying the privacy condition to the corresponding segment may include augmenting a corresponding segment of the image data to visually conceal the identity of the speaker of the corresponding segment of the audio data.

In some configurations, processing the plurality of segments of the audio data to determine the transcript for the audio data includes, for each portion of the transcript that corresponds to one of the segments of the audio data applying the privacy condition, modifying the corresponding portion of the transcript to not include the identity of the speaker. Additionally or alternatively, processing the plurality of segments of the audio data to determine the transcript for the audio data may include, for each segment of the audio data applying the privacy condition, omitting transcribing the corresponding segment of the audio data. The privacy condition may include a content-specific condition, the content-specific condition indicating a type of content to exclude from the transcript.

In some implementations, the operation of determining, from among the plurality of participants, the identity of the speaker of the corresponding segment of the audio data includes determining a plurality of candidate identities for the speaker based on the image data. This implementation includes, for each candidate identity of the plurality of candidate identities, generating a confidence score indicating a likelihood that a face of a corresponding candidate identity based on the image data includes a speaking face of the corresponding segment of the audio data. This implementation also includes selecting the identity of the speaker of the corresponding segment of the audio data as the candidate identify of the plurality of candidate identities associated with the highest confidence score.

In some examples, the data processing hardware resides on a device that is local to at least one participant of the plurality of participants. The image data may include high-definition video processed by the data processing hardware. Processing the plurality of segments of the audio data to determine a transcript for the audio data may include processing the image data to determine the transcript.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
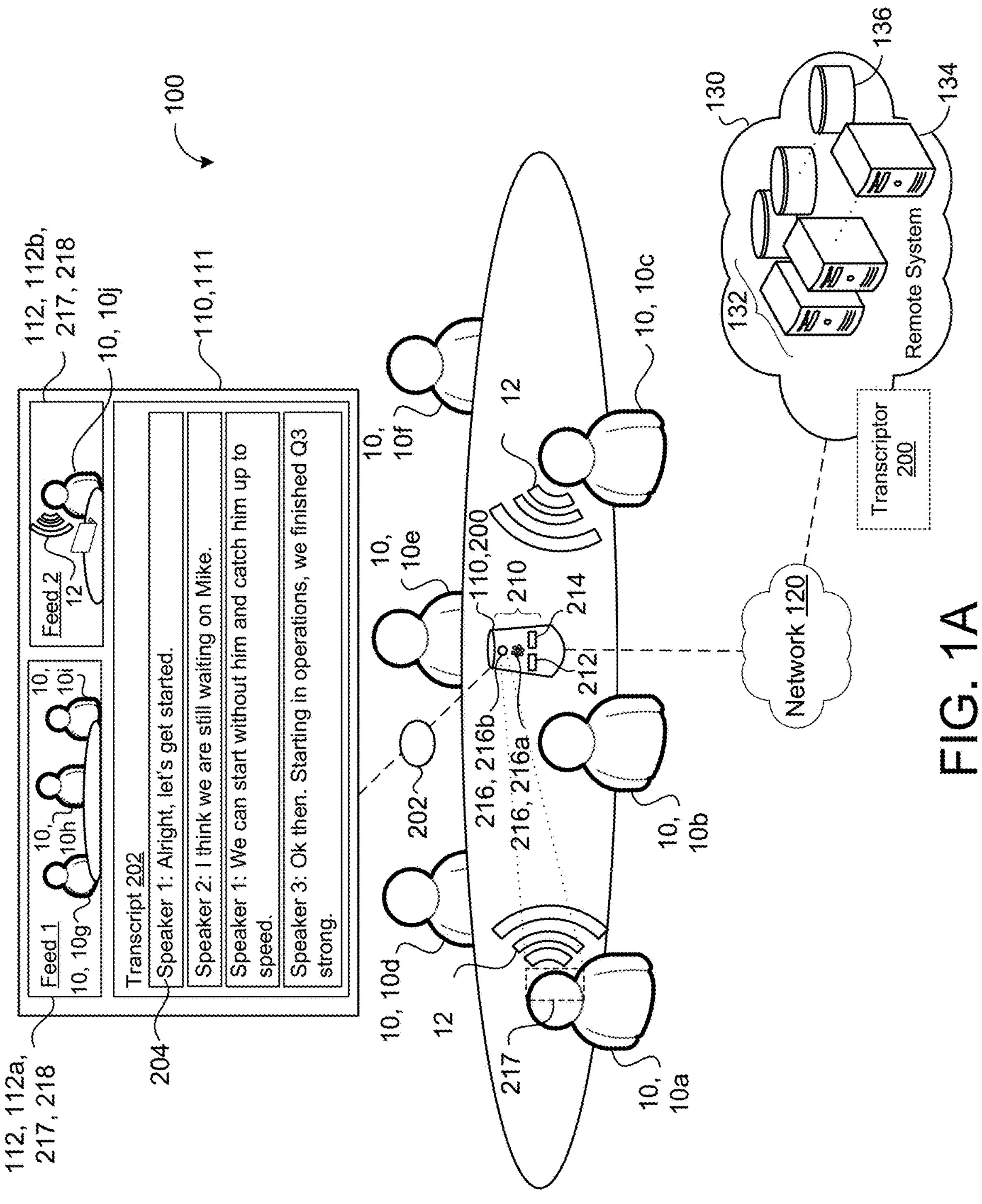
FIG. 1A is a schematic view of an example assembly environment with a transcriptor.

The privacy of data used by, and generated by, video conferencing systems is an important aspect of such systems. Meeting participants may have their own individual view on privacy in relation to the audio and video data acquired during the meeting. There is, therefore, the technical problem of how to provide a video conferencing system that can accurately generate a transcript for a video conference meeting while also catering for such privacy requirements in a reliable and an accurate way. Implementations of the present disclosure provide a technical solution by enabling participants of the meeting to set their own privacy configuration (e.g. opt-in or opt-out of various features of the video conferencing system), with the video conferencing system then implementing the participant's desires accurately and effectively due to the video conferencing system, when generating a transcript, identifying spoken contributions from participants based not only on audio captured during the meeting but also based on video captured during the meeting—this ensures greater accuracy of the identification of the contributors to the video conference, thereby enabling improved accuracy of the transcript while at the same time enabling the accurate and reliable implementation of the participants' bespoke privacy requirements. In other words, a more accurate, reliable and flexible video conferencing system is provided.

Moreover, in some implementations, the process of generating the transcript of the video conference is performed locally to one or more of the participants of the video conference, e.g. by a device in the same room as those participants. In other words, in such implementations, the process of generating the transcript is not performed remotely, such as via one or more remote/cloud servers. This helps ensure that certain privacy desires can be met while also ensuring that full/original resolution and full/original quality video data captured locally is available for use when identifying the speakers during the video conference (as opposed to remote servers operating on lower-resolution and/or lower-quality video, which may detract from accuracy of speaker identification).

In an assembly environment (also referred to generally as an environment), people gather together to communicate thoughts, ideas, schedules, or other concerns. The assembly environment serves as a shared space for its participants. This shared space may be a physical space, such as a meeting room or a classroom, a virtual space (e.g., a virtual meeting room), or any combination thereof. The environment may be a centralized location (e.g., hosted locally) or a decentralized location (e.g., hosted virtually). For example, the environment is a single room where participants gather, such as a conference room or a classroom. In some implementations, the environment is more than one shared space linked together to form the assembly of participants. For instance, a meeting has a host location (e.g., where a coordinator or a presenter of a meeting may be located) and also one or more remote locations attending the meeting (e.g., using real-time communication applications). In other words, a business hosts a meeting from an office in Chicago, but other offices of the business (e.g., in San Francisco or New York) remotely attend the meeting. For instance, there are many businesses who have large meetings across several offices where each office has a meeting space that participates in the meeting. This is especially true as it is becoming more common for members of a team to be distributed across a company (i.e., in more than one location) or even working remotely. Moreover, as applications have become more robust for real-time communication, environments may be hosted for remote offices, remote employees, remote partners (e.g., business partners), remote customers, etc. Therefore, environments have evolved to accommodate a wide array of assembly logistics.

Generally as a space for communication, the environment hosts multiple participants. Here, each participant may contribute audio content (e.g., audible utterances by speaking) and/or visual content (e.g., actions of a participant) while present in the environment. With more than one participant in the environment, there are benefits to track and/or to record the participation of any or all participants. This is especially true as environments accommodate a wide array of assembly logistics. For instance, when the Chicago office hosts a meeting with both the New York office and the San Francisco office remotely attending, it may be difficult for someone in the Chicago office to identify a speaker in one of the remote locations. To illustrate, the Chicago office may include a video feed that captures the meeting room of each office that is remote to the Chicago office. Even with a video feed, the participant in the Chicago office may not be able to distinguish all of the participants in the New York office. For example, a speaker in the New York office is in a location far from a camera associated with the video feed making it difficult for a participant in the Chicago office to identify who the speaker is in the New York office. This may also be difficult when a Chicago-based participant is not familiar with other participants within the meeting (e.g., cannot identify a speaker by his/her voice). When a speaker cannot be identified, it can be problematic because the identity of the speaker may be a critical component during the meeting. In other words, it may be important to identify a speaker (or source of content) to understand takeaways/deliverables or generally to understand who shared what content. For instance, if Sally in the New York office assumes an action item deliverable to Johnny in the Chicago office, but Johnny could not identify that Sally assumed the action item, Johnny may have trouble following up on the action item later. In another scenario, because Johnny could not identify that Sally assumed the action item, Johnny may have incorrectly identified that Tracy (e.g., also in the New York office) assumed the action item. The same may be true on a basic level of simply conversing among participants. If Sally spoke about a certain topic, but Johnny thought it was Tracy speaking, Johnny may cause confusion when he engages Tracy about that topic at a later point in the meeting.

Another issue may arise when a speaker discusses names, acronyms, and/or jargon that another participant is not familiar with and/or cannot completely understand. In other words, Johnny may be discussing an issue that arose with a carrier used during shipping. Pete may chime in to help with Johnny's issue saying, "oh, you will want to speak with Teddy in logistics about that." If Johnny is not familiar with Teddy and/or the logistics team, Johnny may make a note to speak with Freddie instead of Teddy. This also may occur for acronyms or other jargon used in a given industry. For example, if the Chicago office was having a meeting with a Seattle company where the Chicago office hosts the meeting and the Seattle company attends the meeting remotely, participants in the Chicago office may use acronyms and/or jargon that the Seattle company is not familiar with. Without a record or a transcription of the content presented by the Chicago office, the Seattle company, unfortunately, may comprehend less of the meeting (e.g., leading to a poor meeting). Additionally or alternatively, a poor connection between locations or with a meeting hosting platform may also complicate matters for a participant when the participant is trying to understand content during a meeting.

To overcome these issues, a transcription device is present in the environment that generates transcripts for the content that occurs within the environment (e.g., in real-time). When generating the transcript, the device can identify speakers (i.e., participants who generate audio content) and/or associate content with participants also present within the environment. With a transcript of the content presented in the environment, the transcription device is capable of memorializing takeaways and/or deliverables and providing a record of who originates what content that is accessible for participants to reference. For instance, a participant may reference the transcript during the meeting (e.g., in real-time or substantially real-time) or at some later time after the meeting. In other words, Johnny can refer to a display of the transcript generated by the transcription device to recognize that Teddy (not Freddie) is who he needs to talk to in logistics and that he should follow up with Sally (not Tracy) on that action item.

Unfortunately, although a transcript may solve some issues encountered in the environment, it presents an issue with regard to privacy. Here, privacy refers to having a state of being free from observation on the transcript generated by the transcription device. Although there may be many different types of privacy, some examples include content privacy or identity privacy. Here, content privacy is content-based such that it is desired that certain sensitive content is not memorialized in writing or a human-readable format (e.g., confidential content). For example, part of a meeting may include audio content about another employee that is not present in the meeting (e.g., managers discuss a human resource issue that arose). In this example, participants in the meeting would prefer that this part of the meeting regarding the other employee is not transcribed or otherwise memorialized. This may also include not memorializing the audio content that includes the content about the other employee. Here, since a traditional transcription device indiscriminately transcribes content, the meeting would not be able to utilize the traditional transcription device, at least during that portion of the meeting.

Identity privacy refers to a privacy that seeks to maintain an anonymity of a source of the content. For instance, a transcript often includes a label within the transcript that identifies a source of the transcribed content. For instance, labeling a speaker of the transcribed content may be referred to as speaker diarization to answer both "who spoke what" and "who spoke when". When the identity of the source of content is sensitive or the source (e.g., participant) generating the content prefers to mask his/her identity for whatever reason (e.g., personal reasons), the source does not want the label to be associated with the transcribed content. Note that here, unlike content privacy, the source does not mind the content being revealed in the transcript, but does not want an identifier (e.g., the label) to associate the content with the source. Since a traditional transcription device lacks the ability to accommodate these privacy concerns, participants may opt not to use a transcription device even though the aforementioned benefits are surrendered. In order to maintain these benefits and/or preserve the privacy of the participants, the environment may include a privacy-aware transcription device referred to as a transcriptor. In additional examples, when a camera is capturing video of the speaker who wants to remain anonymous, the speaker may choose to not have their recorded image (e.g., face) memorialized. This may include distorting the video/image frames of the speaker's face and/or overlaying graphics that mask the identity of the speaker so that the other individuals in the meeting cannot visually identify the speaker. Additionally or alternatively, the audio of the speaker's voice may be distorted (e.g., by passing the audio through a vocoder) to mask the speaker's voice in a way that anonymizes the speaker.

In some implementations, by processing the privacy on-device during transcription, privacy concerns are further bolstered such that the transcript does not leave the confines of the assembly environment (e.g., a meeting room or a classroom) providing the shared space for its participants. In other words, by using the transcriptor to generate a transcript on-device, speaker labels identifying speakers that want to remain anonymous can be removed on-device to alleviate any concerns that these speakers' identities will be exposed/compromised if processing of the transcript were to occur on a remote system (e.g., cloud environment). Stated different, there is not an un-redacted transcript generated by the transcriptor that may be shared or stored that jeopardizes the privacy of a participant.

Another technical affect of performing audio-video transcription (e.g., audio-video automated speech recognition (AVASR)) on device is a reduced bandwidth requirement since audio and image data (also referred to as video data) may be retained on locally on-device without the need to transmit it to a remote cloud server. For instance, if the video data were to be transmitted to the cloud, it is likely that it would first need to be compressed for transmission. Therefore, another technical effect of performing the video matching on the user device itself is that the video data matching may be performed using the uncompressed (highest quality) video data. The use of uncompressed video data makes it easier to recognize matches between audio data and faces of speakers so that speaker labels assigned to transcribed portions of the audio data spoken by speakers who do not want to be identified can be anonymized. At the same token, the video data capturing individuals' faces who do not want to be identified can be augmented/distorted/blurred to mask these individuals so that they cannot be visually identified if the video recording is shared. Similarly, the audio data representing utterances spoken by these individuals may be distorted to anonymous the speaking voices of these individuals who do not want to be identifiable. Referring to FIGS. 1A-1E, the environment 100 includes a plurality of participants 10, 10*a-j*. Here, the environment 100 is a host meeting room with six participants 10*a-f* attending a meeting (e.g., a video conference) in the host meeting room. The environment 100 includes a display device 110 that receives a content feed 112 (also referred to as a multi-media feed, a content stream, or a feed) via a network 120 from a remote system 130. The content feed 112 may be an audio feed 218 (i.e., audio data 218 such as audio content, an audio signal, or audio stream), a visual feed 217 (i.e., image data 217 such as video content, a video signal, or video stream), or some combination of both (e.g., also referred to as an audio-visual feed, an audio-visual signal, or an audio-visual stream). The display device 110 includes, or communicates with, a display 111 capable of displaying video content 217 and a speaker for audible output of the audio content 218. Some examples of a display device 110 include a computer, a laptop, a mobile computing device, a television, a monitor, a smart device (e.g., smart speaker, smart display, smart appliance), a wearable device, etc. In some examples, the display device 110 includes audio-visual feeds 112 of other meeting rooms attending the meeting. For example, FIGS. 1A-1E depict two feeds 112, 112*a-b* where each feed 112 corresponds to a different remote meeting room. Here, the first feed 112*a* includes three participants 10, 10*g-i* while the second feed 112*b* includes a single participant 10, 10*j* (e.g., an employee working remotely from a home office). To continue the previous example, the first feed 112*a* may correspond to a feed 112 from the New York office, the second feed 112*b* corresponds to a feed 112 from the San Francisco office, and the host meeting room 100 corresponds to the Chicago office.

The remote system 130 may be a distributed system (e.g., cloud computing environment or storage abstraction) having scalable/elastic resources 132. The resources 132 include computing resources 134 (e.g., data processing hardware) and/or storage resources 136 (e.g. memory hardware). In some implementations, the remote system 130 hosts software that coordinates the environment 100 (e.g., on the computing resources 132). For instance, the computing resources 132 of the remote system 130 execute software, such as a real-time communication application or a specialty meeting platform.

With continued reference to FIGS. 1A-1E, the environment 100 also includes a transcriptor 200. The transcriptor 200 is configured to generate a transcript 202 for the content that occurs within the environment 100. This content may be from a location where the transcriptor 200 is present (e.g., participants 10 in a meeting room 100 with the transcriptor 200) and/or from a content feed 112 that communicates content to the location of the transcriptor 200. In some examples, the display device 110 communicates one or more content feeds 112 to the transcriptor 200. For example, the display device 110 includes speakers that output the audio content 218 of the content feed 112 to the transcriptor 200. In some implementations, the transcriptor 200 is configured to receive the same content feed 112 as the display device 110. In other words, the display device 110 may function as an extension of the transcriptor 200 by receiving the audio and video feeds of the content feed 112. For instance, the display device 110 may include hardware 210 such data processing hardware 212 and memory hardware 214 in communication with the data processing hardware 212 that cause the data processing hardware 212 to execute the transcriptor 200. In this relationship, the transcriptor 200 may receive the content feed 112 (e.g., audio and visual content/signals 218, 217) through a network connection rather than only audibly capturing the audio content/signal 218 relayed through a peripheral of the display device 110, such as speakers. In some examples, this connectivity between the transcriptor 200 and the display device 110 enables the transcriptor 200 to seamlessly display the transcript 202 on the display/screen 111 of the display device 110 locally within the environment 100 (e.g., the host meeting room). In other configurations, the transcriptor 200 is located in the same local environment 110 as the display device 110, but corresponds to a computing device separate from the display device 110. In these configurations, the transcriptor 200 communicates with the display device 110 via a wired or wireless connection. For instance, the transcriptor 200 has one or more ports that permit a wired/wireless connection such that the display device 110 functions a peripheral to the transcriptor 200. Additionally or alternatively, an application that forms the environment 100 may be compatible with the transcriptor 200. For instance, the transcriptor 200 is configured as an input/output (I/O) device within the application such that audio and/or visual signals coordinated by the application are channeled to the transcriptor 200 (e.g., in addition to the display device 110).

In some examples, the transcriptor 200 (and optionally the display device 110) is portable such that the transcriptor 200 may be transferred between meeting rooms. In some implementations, the transcriptor 200 is configured with processing capabilities (e.g., processing hardware/software) to process the audio and video content 112 and generate the transcript 202 when the content 112 is being presented in the environment 100. In other words, the transcriptor 200 is configured to process content 112 (e.g., audio and/or visual content 218, 217) locally at the transcriptor 200 to generate the transcript 202 without any additional remote processing (e.g., at the remote system 130). Here, this type of processing is referred to as on-device processing. Unlike remote processing that often uses low fidelity, compressed video on server-based applications due to bandwidth constraints, on-device processing may be free of bandwidth constraints and thus allow the transcriptor 200 to utilize more accurate high definition video with high fidelity when processing visual content. Moreover, this on-device processing may allow an identity of a speaker to be tracked in real-time without delays due to latency that may occur if audio and/or visual signals 218, 217 were, in some degree, remotely processed (e.g., in the remote computing system 130 connected to the transcriptor 200). In order to process content at the transcriptor 200, the transcriptor 200 includes the hardware 210 such as the data processing hardware 212 and the memory hardware 214 in communication with the data processing hardware 212. Some examples of data processing hardware 212 include a central processing unit (CPU), a graphics processing unit (GPU), or a tensor processing unit (TPU).

In some implementations, the transcriptor 200 executes on the remote system 130 by receiving content 112 (audio and video data 217, 218) from each of the first and second feeds 112*a-b*, as well as a feed 112 from the meeting room environment 100. For instance, the data processing hardware 134 of the remote system 130 may execute instructions stored on the memory hardware 136 of the remote system 130 for executing the transcriptor 200. Here, the transcriptor 200 may process the audio data 218 and image data 217 to generate the transcript 202. For example, the transcriptor 200 may generate the transcript 202 and transmit the transcript 202 over the network 120 to the display device 110 for display thereon. The transcriptor 200 may similarly transmit the transcript 202 to computing devices/display devices associated with the participants 10*g-i* corresponding to the first feed and/or the participant 10*j* corresponding to the second feed 10*j*.

In addition to processing hardware 210, the transcriptor 200 includes peripherals 216. For instance, in order to process audio content, the transcriptor 200 includes an audio capturing device 216, 216*a* (e.g., a microphone) that captures a sound (e.g., a speech utterance) about the transcriptor 200 and converts the sound into an audio signal 218 (FIGS. 2A and 2B) (or audio data 218). The audio signal 218 may then be used by the transcriptor 200 to generate the transcript 202.

In some examples, the transcriptor 200 also includes an image capturing device 216, 216*b* as a peripheral 216. Here, the image capturing device 216*b* (e.g., one or more cameras) may capture image data 217 (FIGS. 2A and 2B) as an additional source of input (e.g., a visual input) that, in combination with an audio signal 218, aids in identifying which participant 10 in the multi-participant environment 100 is speaking (i.e., a speaker). In other words, by including both the audio capturing device 216*a* and the image capturing device 216*b*, a transcriptor 200 may increase its accuracy for speaker identification because the transcriptor 200 may process image data 217 captured by image capturing device 216*b* to identify visual features (e.g., facial features) that indicate which participant 10, among the multiple participants 10*a*-10*j*, is speaking (i.e., generating utterances 12) at a particular instance. In some configurations, the image capturing device 216*b* is configured to capture 360-degrees about the transcriptor 200 to capture a full view of the environment 100. For instance, the image capturing device 216*b* includes an array of cameras configured to capture the 360-degree view.

Additionally or alternatively, using image data 217 may improve the transcript 202 when a participant 10 has a speech disability. For instance, the transcriptor 200 may have difficulty generating a transcript for a speaker with a speech disability that causes the speaker to have issues articulating speech. To overcome inaccuracies in the transcript 202 caused by such articulation issues, the transcriptor 200 (e.g., at an automatic speech recognition (ASR) module 230 of FIGS. 2A and 2B) may be made aware of the articulation issue during generation of the transcript 202. By being aware of the issue, the transcriptor 200 may accommodate for the issue by leveraging image data 217 representing the face of the participant 10 while speaking to generate an improved, or otherwise more accurate, transcript 202 than if the transcript 202 were based on the audio data 218 of the participant 10 alone. Here, certain speech disabilities may be noticeable in the image data 217 from the image capturing device 216*b*. For example, in the case of speech dysarthria, neural muscular disorders causing lip motion affecting articulation may be recognizable in the images 217. Moreover, techniques may be employed where image data 217 can be analyzed to correlate the lip motion of participants 10 with particular speech disorders into the speech intended by these participants 10 to thereby improve automatic speech recognition in ways that would not be possible using audio data 218 alone. In some implementations, by using the images 217 as an input to the transcriptor 200, the transcriptor 200 identifies a potential articulation issue and factors this issue to improve generation of the transcription 202 during ASR.

Figure 5:
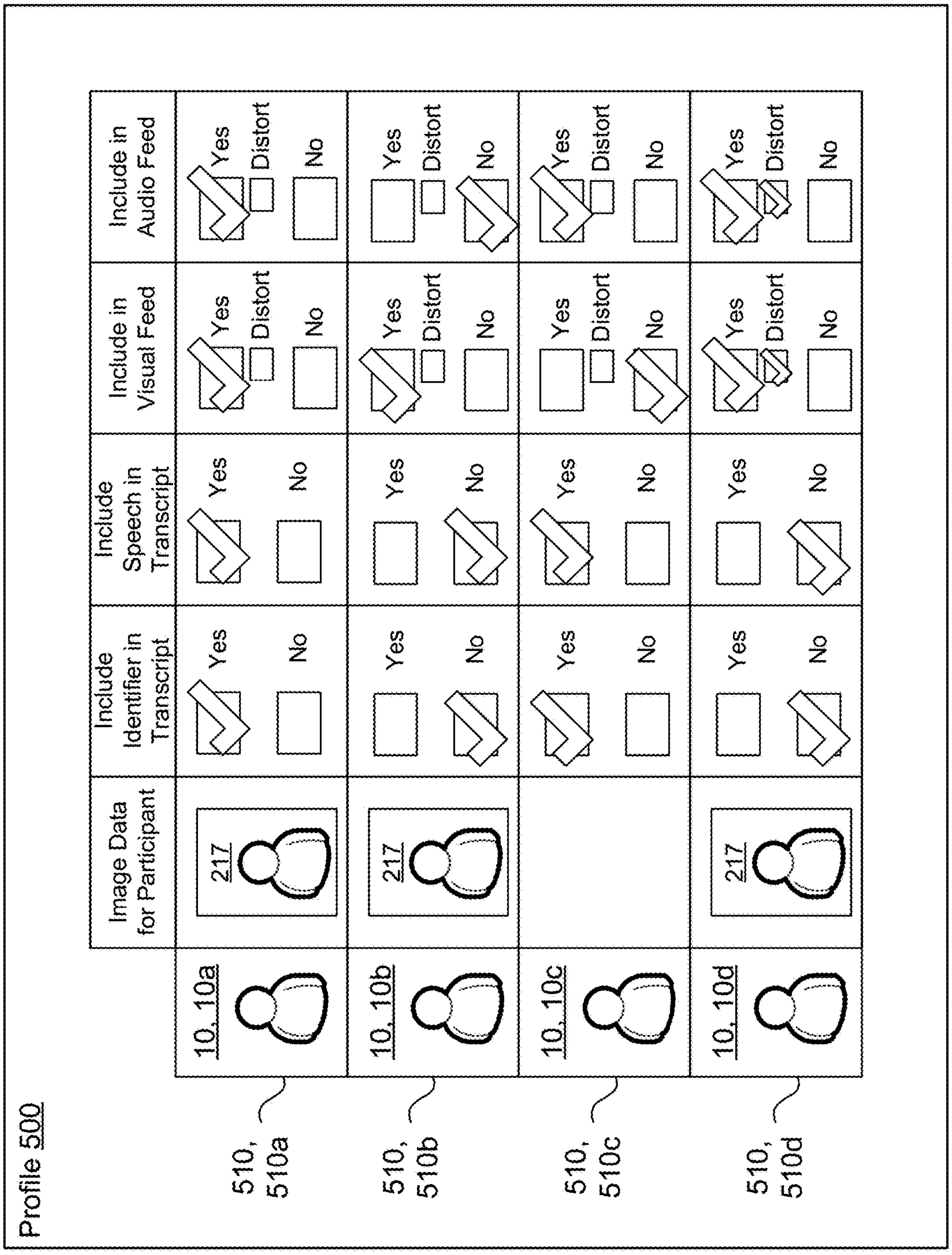
FIG. 5 is a schematic view of an example profile stored in memory hardware accessible to a transcriptor.

In some implementations, such as FIGS. 1B-1E, the transcriptor 200 is privacy-aware such that a participant 10 may opt out of having any of his or her speech and/or image information shared (e.g., in a transcript 202 or visual feed 112, 217). Here, one or more participants 10 communicate a privacy request 14 that indicates a privacy condition for a participant 10 during participation in the video conference environment 100. In some examples, the privacy request 14 corresponds to configuration settings for the transcriptor 200. The privacy request 14 may occur before, during, or at the onset of a meeting or communication session with the transcriptor 200. In some configurations, the transcriptor 200 includes a profile (e.g., profile 500 as shown in FIG. 5) that indicates one or more privacy requests 14 for the participant 10 (e.g., the individual profiles 510, 510*a-n* of FIG. 5). Here, the profile 500 may be stored on-device (e.g., in the memory hardware 214) or stored off-device (e.g., in the remote storage resources 136) and accessed by the transcriptor 200. The profile 500 may be configured before the communication session and may include an image (e.g., image data 217) of the respective participant's 10 face so the participant 10 can be correlated with respective portions of the received video content 217. That is, an individual profile 510 for a respective participant 10 may be accessed when video content 217 of that participant 10 in the content feed 112 matches the facial image associated with the individual profile 510. With an individual profile 510, the participant's privacy settings may be applied during each communication session in which the participant 10 participates. In these examples, the transcriptor 200 may recognize the participant 10 (e.g., based on image data 217 received at the transcriptor 200) and apply the appropriate settings for the participant 10. For instance, the profile 500 may include an individual profile 510, 510*b* for a particular participant 10, 10*b* that indicates the particular participant 10*b* doesn't mind being seen (i.e., included in a visual feed 217), but does not want to be heard (i.e., not included in audio feed 218) nor have his/her utterances 12 transcribed (i.e., not included speech in the transcript 202), while another individual profile 510, 510*c* for another participant 10, 10*c* may not want to be seen (i.e., not included in the visual feed 217), but is fine with having his/her utterances recorded and/or transcribed (i.e., included in the audio feed 218 and included in the transcript 202).

Figure 1B:
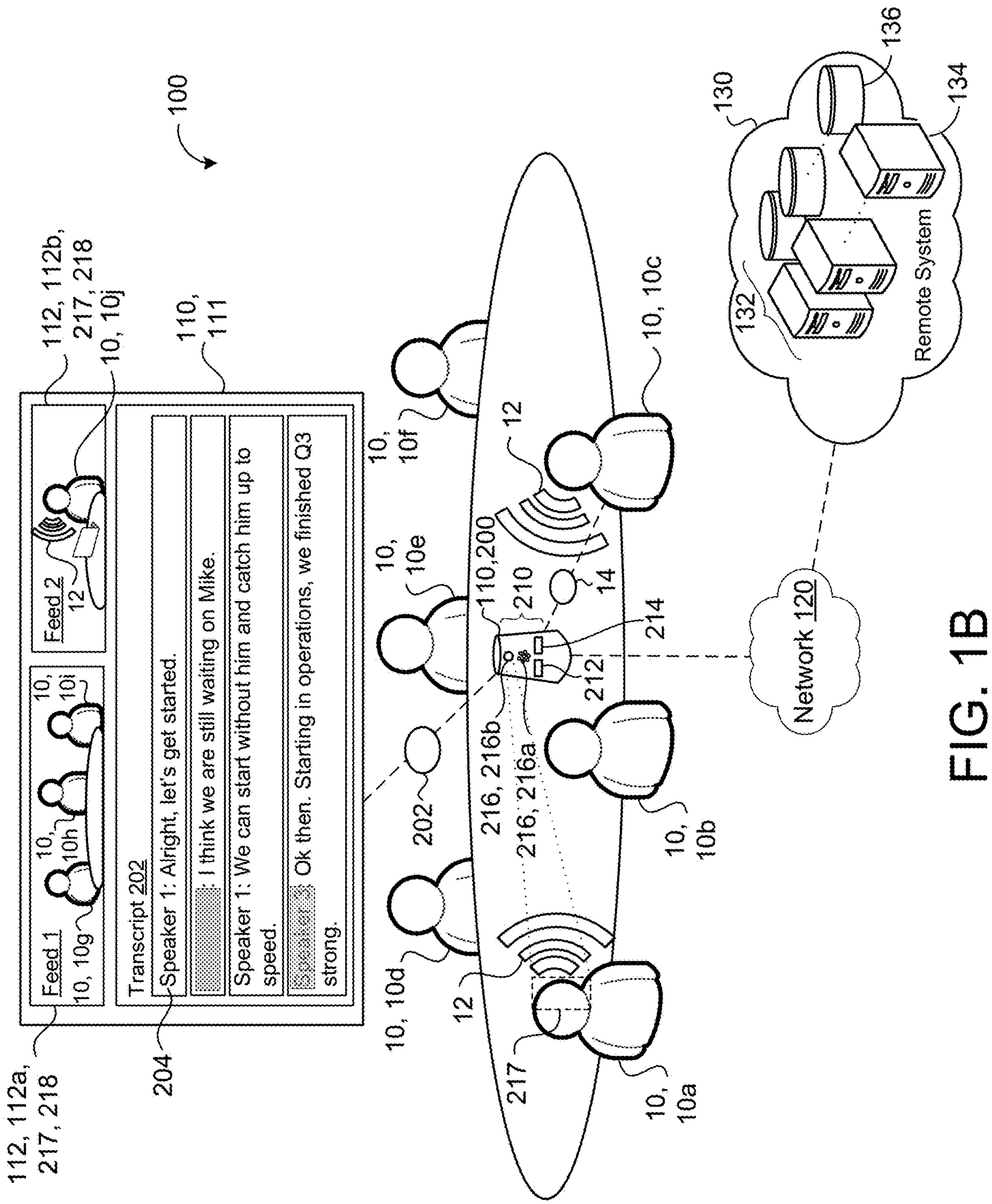
FIGS. 1B-1E are schematic views of the example assembly environment of FIG. 1A with a privacy-aware transcriptor.

Referring to FIG. 1B, the third participant 10*c* has submitted a privacy request 14 with a privacy condition that indicates that the third participant 10*c* does not mind being seen or heard, but does not want the transcript 202 to include an identifier 204 (e.g., a label of the identity for the speaker) for the third participant 10*c* when the third participant 10*c* speaks (i.e., a privacy request 14 for identity privacy). In other words, the third participant 10*c* does not want his or her identity shared or stored; therefore, the third participant 10*c* opts for the transcript 202 to not include an identifier 204 associated with the third participant 10*c* that reveals his or her identity. Here, although FIG. 1B illustrates the transcript 202 with a redacted gray box where the identifier 204 of the Speaker 3 would exist, the transcriptor 200 may also remove the identifier 204 completely or obscure the identifier 204 in other ways that prevent the identity of the speaker associated with the privacy request 14 from being revealed by the transcriptor 200. In other words, FIG. 1B illustrates that the transcriptor 200 modifies a portion of the transcript 202 to not include the identity of the speaker (e.g., by removing or obscuring the identifier 204).

Figure 1C:
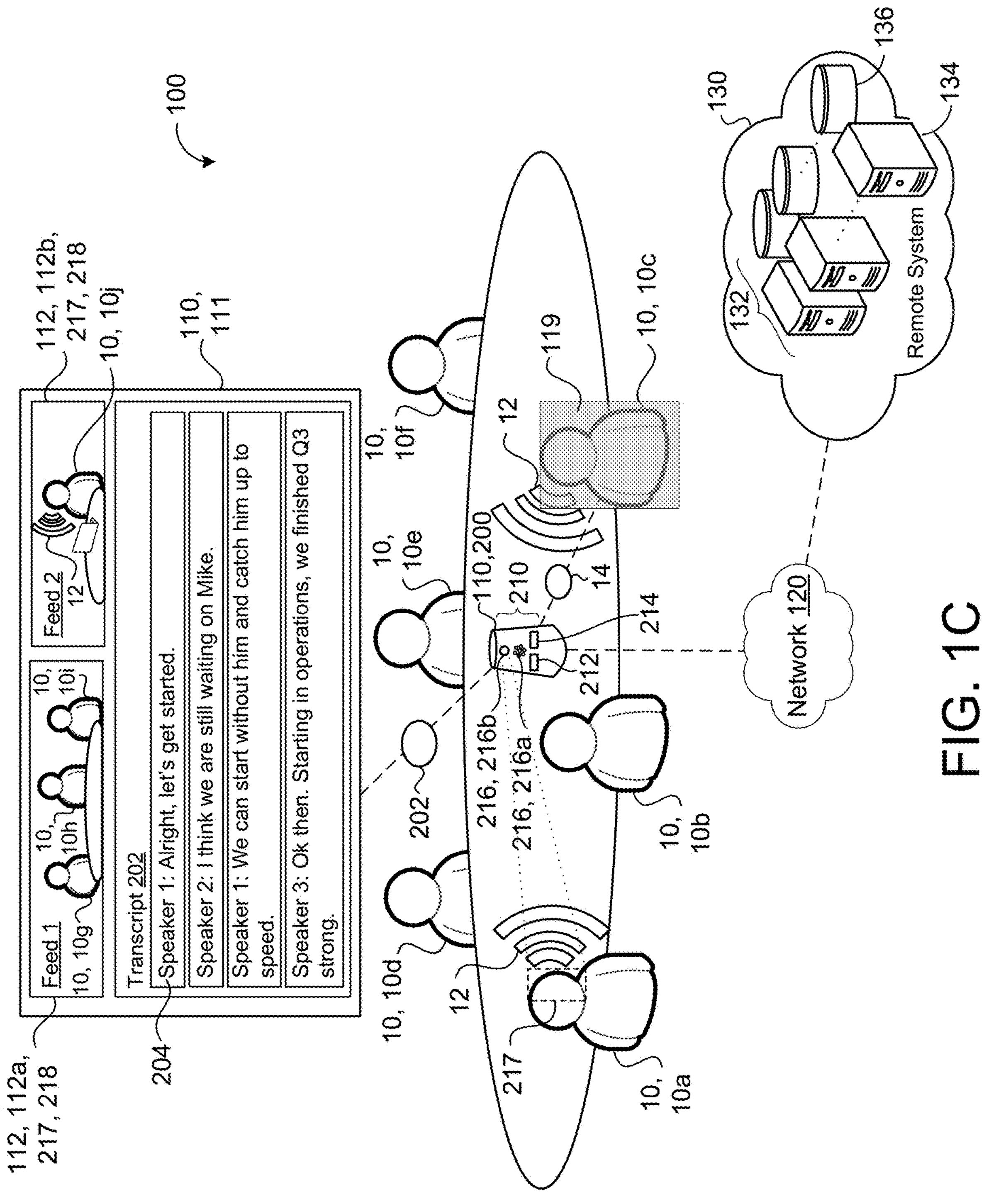

FIG. 1C is similar to FIG. 1B except that the third participant 10*c* who communicates the privacy request 14 requests to not be seen in any visual feed 112, 217 of the environment 100 (e.g., another form of identity privacy). Here, the requesting participant 10*c* may not mind being heard, but prefers to visually conceal his or her visual identity (i.e., not share nor store his or her visual identity in a visual feed 112, 217). In this circumstance, the transcriptor 200 is configured to blur, distort, or otherwise obscure the visual presence of the requesting participant 10*c* throughout a communication session between the participants 10, 10*a*-10*j*. For instance, the transcriptor 200 determines, from image data 217 received from one or more content feeds 112, the location of the requestor 10*c* at any particular instance and applies an abstraction 119 to any physical features of the requestor (e.g., a blurring) that are communicated through the transcriptor 200. That is, when the image data 217 is displayed on the screen 111 of the display device 110, as well as displayed on screens in the remote environments associated with the participants 10*g*-10*j*, the abstraction 119 is overlaid over at least the face of the requestor 10*c* so that the requestor 10*c* cannot be visually identified. In some examples, the individual profile 510 for a participant 10 identifies whether the participant 10 wants to be blurred or obscured (i.e., distorted) or removed completely (e.g., as shown in FIG. 5). Accordingly, the transcriptor 200 is configured to augment, modify, or remove portions of video data 217 to conceal a participant's visual identity.

Figure 1D:
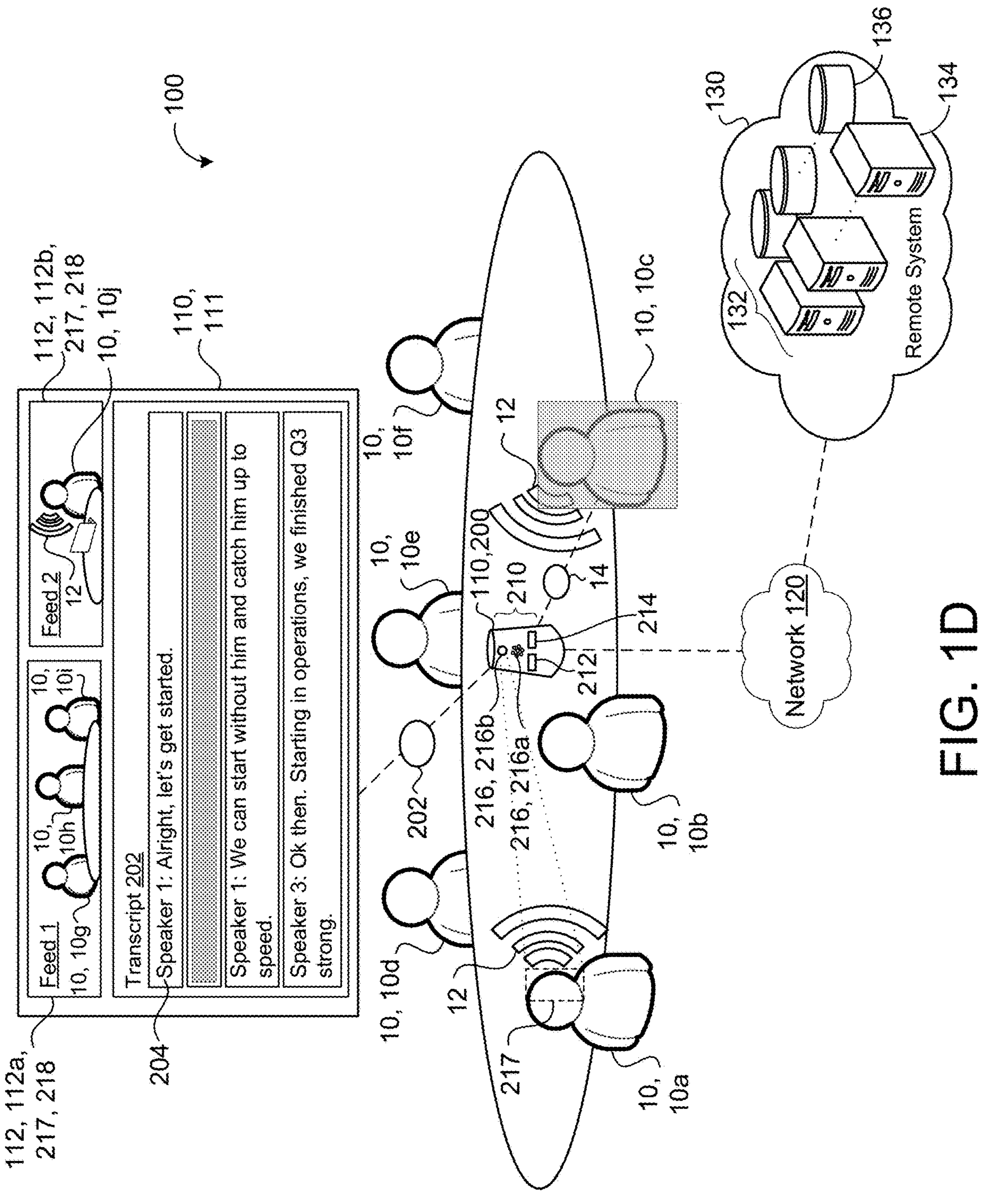

In contrast, FIG. 1D illustrates an example where a privacy request 14 from the third participant 10*c* requests that the transcriptor 200 not track either a visual representation of the third participant 10*c* or speech information of the third participant 10*c*. As used herein, 'speech information' refers to audio data 218 corresponding to utterances 12 spoken by the participant 10*c* as well as transcripts 202 recognized from the audio data 218 corresponding to the utterances 12 spoken by the participant 10*c*. In this example, the participant 10*c* may be heard during the meeting, but the transcriptor 200 does not memorialize the participant 10*c* audibly or visually (e.g., by video feed 217 or in a transcript 202). This approach may preserve the participant's 10*c* privacy by having no record of any speech information of the participant 10*c* in the transcript 202 or any identifier 204 identifying the participant 10*c* in the transcript 202. For instance, the transcriptor 200 may omit portions of text in the transcript 202 altogether that transcribe utterances 12 spoken by the participant 10*c*, or the transcript 202 may leave these portions of the text in but not apply the identifier 204 identifying the participant 10*c*. The transcriptor 200 may, however, apply some other arbitrary identifier that does not personally identify the participant 10*c*, but merely delineates these portions of the text in the transcription 202 from other portions corresponding to utterances 12 spoken by the other participants 10*a*, 10*b*, 10*d*-10*j*. In other words, a participant 10 may request (e.g., via the privacy request 14) that the transcript 202 and any other record generated by the transcriptor 200 have no record of the participant's participation in the communication session.

Figure 1E:
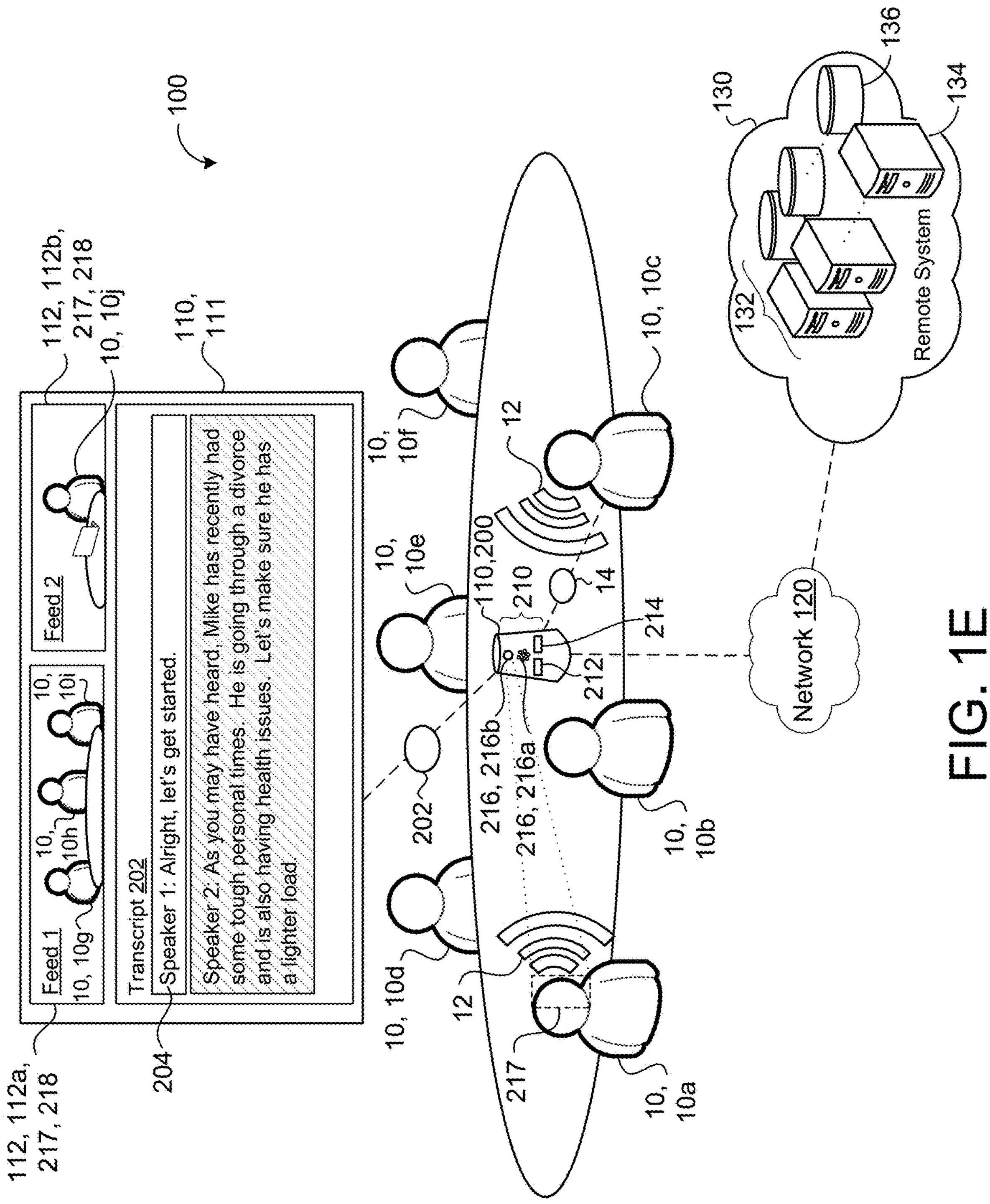

In contrast to the identity privacy requests 14, FIG. 1E depicts a content privacy request 14. In this example, the third participant 10*c* communicates a privacy request 14 that the transcriptor 200 does not include any content from the third participant 10*c* in the transcript 202. Here, the third participant 10*c* makes such a privacy request 14 because the third participant 10*c* is going to discuss sensitive content (e.g., confidential information) during the meeting. Due to the sensitive nature of the content, the third participant 10*c* takes the precaution that the transcriptor 200 does not memorialize the audio content 218 associated with the third participant 10*c* in the transcript 202. In some implementations, the transcriptor 200 is configured to receive a privacy request 14 that identifies a type of content that one or more participants 10 do not want included in the transcript 202 (e.g., by keywords) and to determine when that type of content occurs during the communication session in order to exclude it from the transcript 202. In these implementations, not all audio content 218 from a particular participant 10 is excluded from the transcript 202, only content-specific audio such that the particular participant still may discuss other types of content and be included in the transcript 202. For instance, the third participant 10*c* communicates a privacy request 14 that requests that the transcriptor 200 does not transcribe audio content about Mike. In this instance, when the third participant 10*c* discusses Mike, the transcriptor 200 does not transcribe this audio content 218, but when the third participant talks about other topics (e.g., the weather), the transcriptor 200 does transcribe this audio content 218. The participant 10*c* may similarly set time boundaries to that the transcriptor 200 does not memorialize any audio content 218 for a length of time, e.g., the next 2-minutes.

Figure 2A:
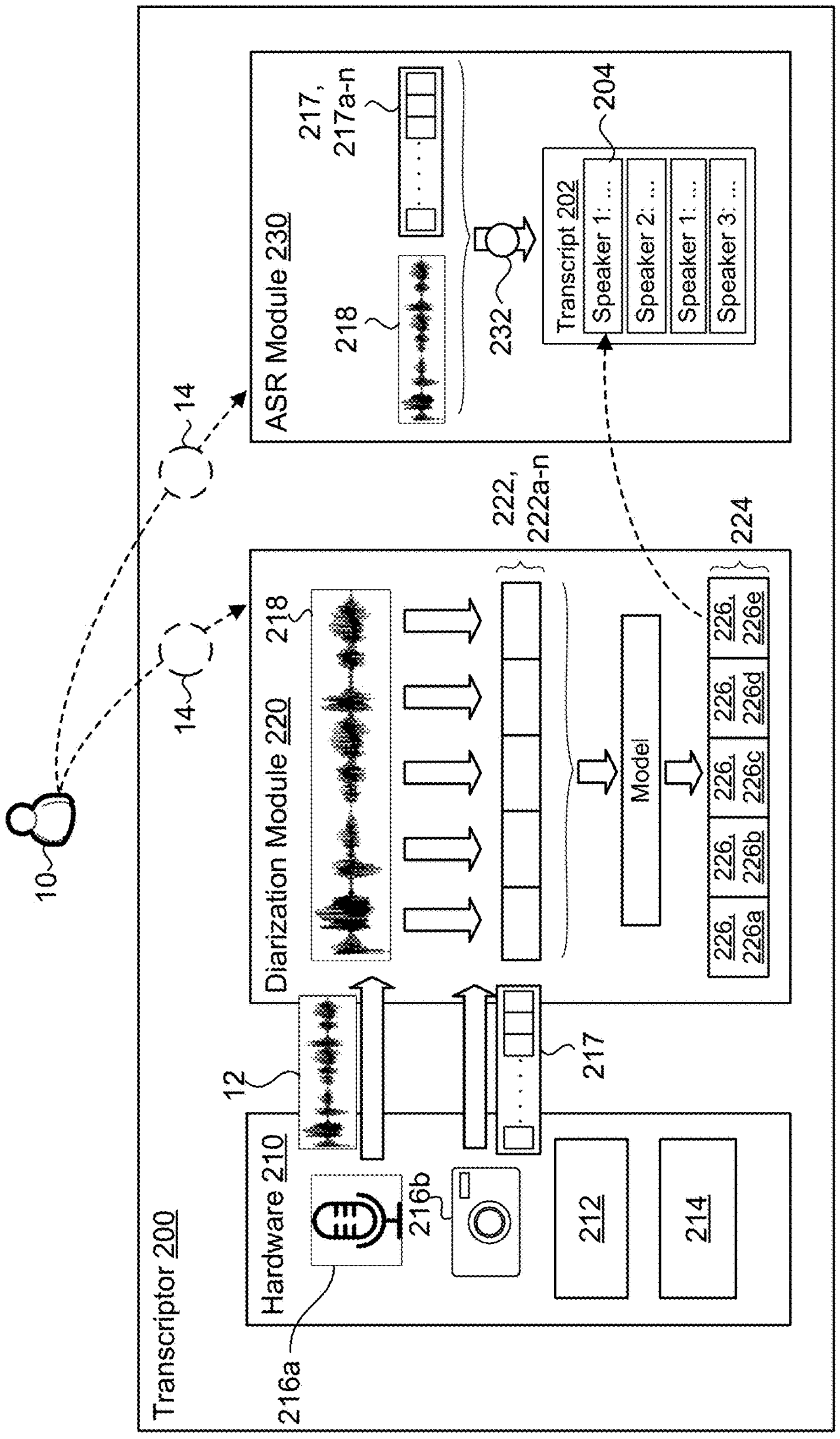
FIGS. 2A and 2B are schematic views of example transcriptors.
Figure 2B:
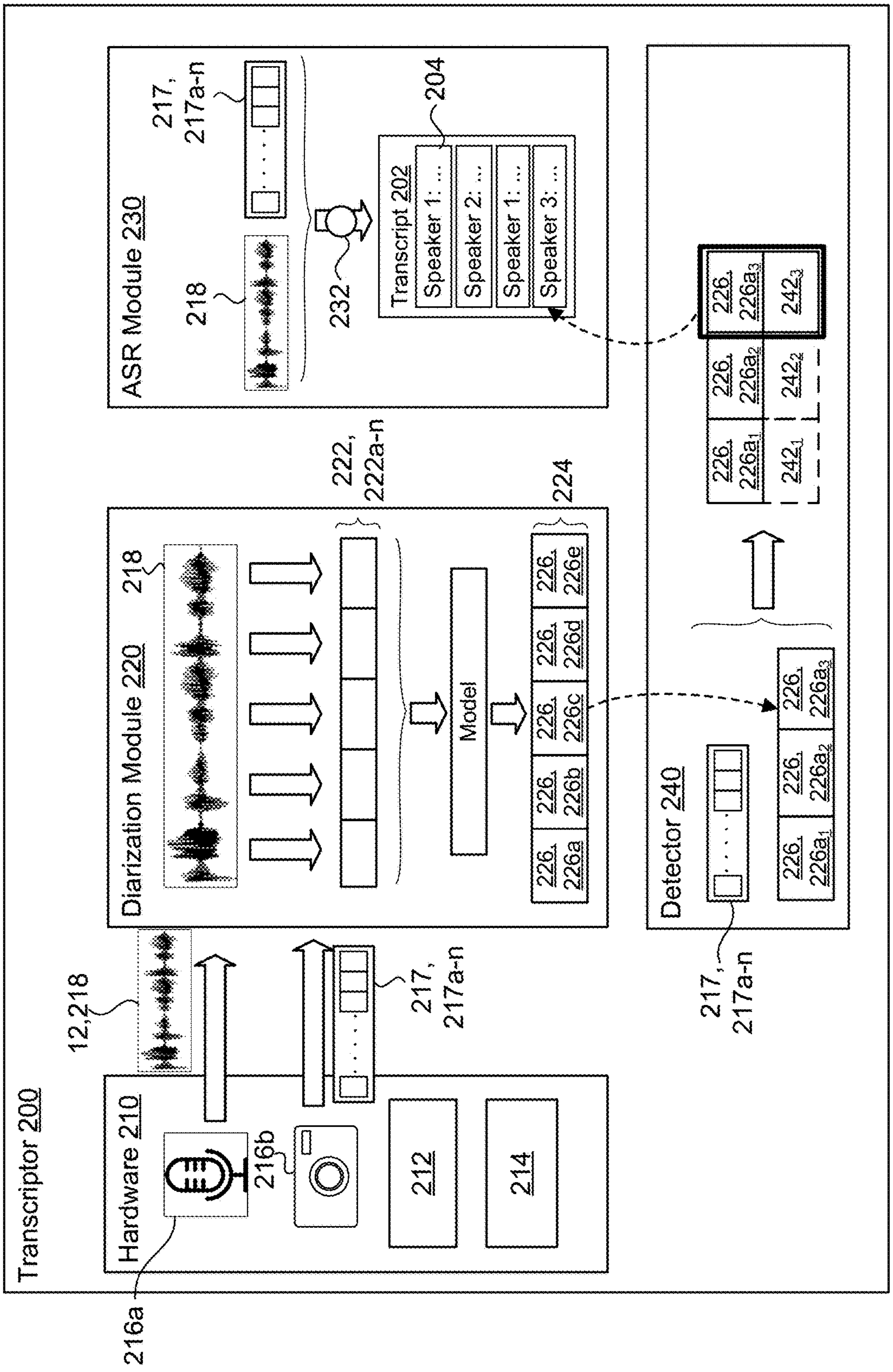

FIGS. 2A and 2B are examples of the transcriptor 200. The transcriptor 200 generally includes a diarization module 220 and an ASR module 230 (e.g., an AVASR module). The diarization module 220 is configured to receive audio data 218 that corresponds to the utterances 12 from the participants 10 of the communication session (e.g., captured by the audio capturing device 216*a*) and image data 217 representing faces of the participants 10 of the communication session, segment the audio data 218 into a plurality of segments 222, 222*a-n* (e.g., fixed-length segments or variable-length segments), and generate diarization results 224 that include a corresponding speaker label 226 assigned to each segment 222 using a probability model (e.g., a probabilistic generative model) based on the audio data 218 and the image data 217. In other words, the diarization module 220 includes a series of speaker recognition tasks with short utterances (e.g., segments 222) and determines whether two segments 222 of a given conversation were spoken by the same participant 10. Simultaneously, the diarization module 220 may execute a face tracking routine to identify which participant 10 is speaking during which segment 222 to further optimize speaker recognition. The diarization module 220 is then configured to repeat the process for all segments 222 of the conversation. Here, the diarization results 224 provide time-stamped speaker labels 226, 226*a-e* for the received audio data 218 that not only identify who is speaking during a given segment 222, but also identify when speaker changes occur between adjacent segments 222. Here, the speaker labels 226 may serve as identifiers 204 within the transcript 202.

In some examples, the transcriptor 200 receives the privacy request 14 at the diarization module 220. Since the diarization module 220 identifies speaker labels 226 or identifiers 204, the diarization module 220 may advantageously resolve a privacy request 14 that corresponds to an identity-based privacy request 14. In other words, the diarization module 220 receives a privacy request 14 when the privacy request 14 requests not to identify a participant 10 by an identifier 204 such as the label 226 when the participant 10 is the speaker. When the diarization module 220 receives a privacy request 14, the diarization module 220 is configured to determine whether the participant 10 corresponding to the request 14 matches the label 226 generated for a given segment 222. In some examples, an image of the participant's 10 face may be used to associate the participant 10 with the label 226 for that participant 10. When the label 226 for a segment 222 matches an identity of the participant 10 corresponding to the request 14, the diarization module 220 may prevent the transcriptor 200 from applying the label 226 or identifier 204 to a corresponding portion of the resulting transcription 202 that transcribes the particular segment 222 into text. When the label 226 for a segment 222 fails to match an identity of the participant 10 corresponding to the request 14, the diarization module 220 may allow the transcriptor to apply the label 226 and identifier 204 to the portion of the resulting transcription 202 that transcribes the particular segment into text. In some implementations, when the diarization module 220 receives the request 14, the ASR module 230 is configured to wait to transcribe the audio data 218 from utterances 12. In other implementations, the ASR module 230 transcribes in real-time and the resulting transcription 202 removes labels 226 and identifiers 204 in real-time for any participants 10 providing privacy requests 14 opting out from having their speech information transcribed. Optionally, the diarization module 220 may further distort the audio data 218 associated with these participants 10 seeking privacy so that their speaking voice is altered in a way that cannot be used to identify the participant 10.

The ASR module 230 is configured to receive the audio data 218 corresponding to the utterances 12 and the image data 217 representing faces of the participants 10 while speaking the utterances 12. Using the image data 217, the ASR module 230 transcribes the audio data 218 into corresponding ASR results 232. Here, the ASR result 232 refers to a textual transcription of the audio data 218 (e.g., the transcript 202). In some examples, the ASR module 230 communicates with the diarization module 220 to utilize the diarization results 224 associated with the audio data 218 for improving speech recognition based on utterances 12. For instance, the ASR module 230 may apply different speech recognition models (e.g., language models, prosody models) for different speakers identified from the diarization results 224. Additionally or alternatively, the ASR module 230 and/or the diarization module 220 (or some other component of the transcriptor 200) may index a transcription 232 of the audio data 218 using the time-stamped speaker labels 226 predicted for each segment 222 obtained from the diarization results 224. Stated differently, the ASR module 230 uses the speaker labels 226 from the diarization module 220 to generate the identifiers 204 for speakers within the transcript 202. As shown in FIGS. 1A-1E, the transcript 202 for a communication session within the environment 100 may be indexed by speaker/participant 10 to associate portions of the transcript 202 with the respective speaker/participant 10 in order to identify what each speaker/participant 10 said.

In some configurations, the ASR module 230 receives the privacy request 14 for the transcriptor 200. For example, the ASR module 230 receives the privacy request 14 for the transcriptor 200 whenever the privacy request 14 corresponds to a request 14 not to transcribe speech for a particular participant 10. In other words, the ASR module 230 may receive the privacy request 14 whenever the request 14 is not a label/identifier based privacy request 14. In some examples, when the ASR module 230 receives a privacy request 14, the ASR module 230 first identifies the participant 10 corresponding to the privacy request 14 based on the speaker labels 226 determined by the diarization module 220. Then, when the ASR module 230 encounters speech to be transcribed for that participant 10, the ARS module 230 applies the privacy request 14. For instance, when the privacy request 14 requests not to transcribe speech for that particular participant 10, the ASR module 230 does not transcribe any speech for that participant and waits for speech to occur by a different participant 10.

Referring to FIG. 2B, in some implementations, the transcriptor 200 includes a detector 240 for executing the face tracking routine. In these implementations, the transcriptor 200 first processes the audio data 218 to generate one or more candidate identities for the speaker. For example, for each segment 222, the diarization module 220 may include multiple labels 226, 226$a_{1-3}$ as candidate identities for the speaker. In other words, the model may be a probability model that outputs multiple labels 226, 226$a_{1-3}$ for each segment 222 where each label 226 of the multiple labels 226, 226$a_{1-3}$ is a potential candidate that identifies the speaker. Here, the detector 240 of the transcriptor 200 uses the images 217, 217*a-n* captured by the image capturing device 216*b* to determine which candidate identity had the best visual features indicating that he or she is the speaker of a particular segment 22. In some configurations, the detector 240 generates a score 242 for each candidate identity where the score 242 indicates a confidence level that the candidate identity is the speaker based on the association between the audio signal (e.g., audio data 218) and the visual signal (e.g., the captured images 217*a-n*). Here, the highest score 242 may indicate the greatest likelihood that the candidate identity is the speaker. In FIG. 2B, the diarization module 220 generates three labels $\mathbf{226}a_{1\text{-}3}$ at a particular segment 222. The detector 240 generates a score 242 for each of these labels 226 (e.g., shown as three scores $\mathbf{242}_{1\text{-}3}$) based on images 217 from the time in the audio data 218 where the segment 222 occurs. Here, FIG. 2B indicates the highest score 242 by a bolded square around the third label $\mathbf{226}a_3$ associated with the third score $\mathbf{242}_3$. When the transcriptor 200 includes the detector 240, the best candidate identity may be communicated to the ASR module 230 to form the identifier 204 of the transcript 202.

Additionally or alternatively, the process may be reversed such that the transcriptor 200 first processes the image data 217 to generate one or more candidate identities for the speaker based on the image data 217. Then for each candidate identity, the detector 240 generates a confidence score 242 indicating a likelihood that a face of the corresponding candidate identity includes a speaking face for a corresponding segment 222 of audio data 218. For instance, the confidence score 242 for each candidate identity indicates a likelihood that a face of the corresponding candidate identity includes a speaking face during the image data 217 corresponding to an instance of time for a segment 222 of the audio data 218. In other words, for each segment 222, the detector 240 may score 242 whether image data 217 corresponding to participants 10 has facial expressions similar to or matching the facial expressions of a speaking face. Here, the detector 240 selects the identity of the speaker of the corresponding segment of the audio data 218 with the highest confidence score 242 as the candidate identity.

In some examples, the detector 240 is part of the ASR module 230. Here, the ASR module 230 executes the face tracking routine by implementing an encoder frontend having an attention layer configured to receive a plurality of video tracks 217*a-n* of the image data 217, whereby each video track is associated with a face of a respective participant. In these examples, the attention layer at the ASR module 230 is configured to determine a confidence score indicating a likelihood that the face of the respective person associated with the video face track includes a speaking face of the audio track. Additional concepts and features related to an audio-visual ASR module including an encoder front end having an attention layer for multi-speaker ASR recognition can be found in U.S. Provisional Patent Application 62/923,096, filed on Oct. 18, 2019, which is hereby incorporated by reference in its entirety.

Figure 3:
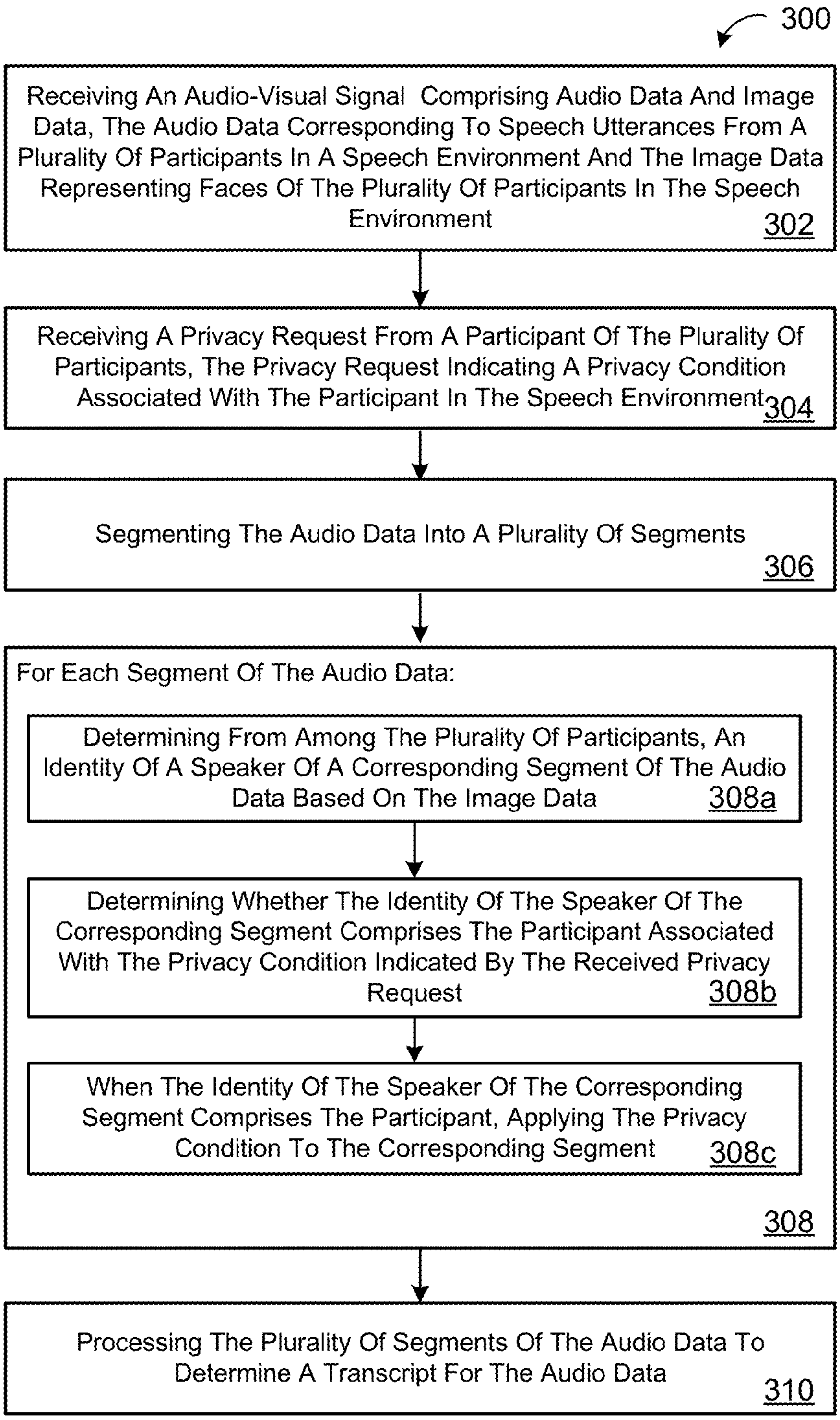
FIG. 3 is a flowchart of an example arrangement of operations for a method of transcribing content within the assembly environment of FIG. 1A.

In some configurations, the transcriptor 200 (e.g., at the ASR module 230) is configured to support a multi-lingual environment 100. For example, when the transcriptor 200 generates the transcript 202, the transcriptor 200 is capable of generating the transcript 202 in different languages. This feature may enable the environment 100 to include a remote location that has one or more participants 10 that speak a different language than the host location. Moreover, in some situations, the speaker in a meeting may be a non-native speaker or a speaker where the language of the meeting is not the first language of the speaker. Here, a transcript 202 of the content from the speaker may assist other participants 10 in the meeting to understand the presented content. Additionally or alternatively, the transcriptor 200 may be used to provide a speaker with feedback on his or her pronunciation. Here, by combining the video and/or the audio data, the transcriptor 200 may indicate an incorrect pronunciation (e.g., allowing a speaker to learn and/or to adapt with the help of the transcriptor 200). As such, the transcriptor 200 may provide a notification to the speaker that provides the feedback on his/her pronunciation FIG. 3 is an example arrangement of operations for a method 300 of transcribing content (e.g., at the data processing hardware 212 of the transcriptor 200). At operation 302, the method 300 includes receiving an audio-visual signal 217, 218 including audio data 218 and image data 217. The audio data 218 corresponds to speech utterances 12 from a plurality of participants 10, 10*a-n* in a speech environment 100 and the image data 217 represents faces of the plurality of participants 10 in the speech environment 100. At operation 304, the method 300 includes receiving a privacy request 14 from a participant 10 of the plurality of participants 10*a-n*. The privacy request 14 indicates a privacy condition associated with the participant 10 in the speech environment 100. At operation 306, the method 300 segments the audio data 218 into a plurality of segments 222, 222*a-n*. At operation 308, the method 300 includes performing operations 308, 308*a-c* for each segment 222 of the audio data 218. At operation 308*a*, for each segment 222 of the audio data 218, the method 300 includes determining from among the plurality of participants 10*a-n*, an identity of a speaker of a corresponding segment 222 of the audio data 218 based on the image data 217. At operation 308*b*, for each segment 222 of the audio data 218, the method 300 includes determining whether the identity of the speaker of the corresponding segment 222 includes the participant 10 associated with the privacy condition indicated by the received privacy request 14. At operation 308*c*, for each segment 222 of the audio data 218, when the identity of the speaker of the corresponding segment 222 includes the participant 10, the method 300 includes applying the privacy condition to the corresponding segment 222. At operation 310, the method 300 includes processing the plurality of segments 222*a-n* of the audio data 218 to determine a transcript 202 for the audio data 218.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined.

Figure 4:
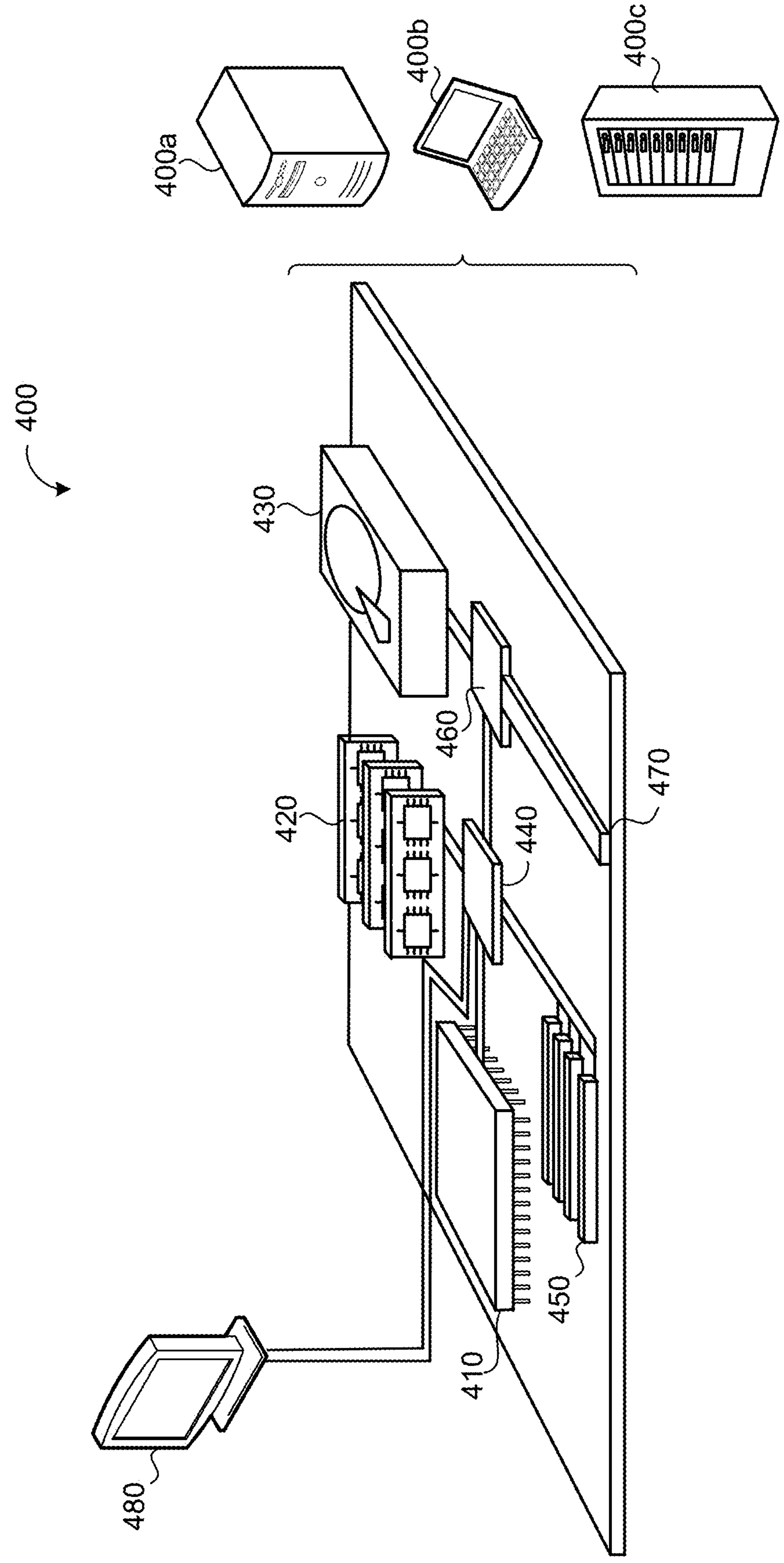
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server **400*a* or multiple times in a group of such servers 400*a*, as a laptop computer 400*b*, or as part of a rack server system 400*c***.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
- receiving an audio-visual signal comprising audio data and image data, the audio data corresponding to speech utterances from a plurality of participants in a speech environment and the image data representing faces of the plurality of participants in the speech environment;
- receiving a privacy request associated a respective participant of the plurality of participants, the privacy request indicating that the respective participant opts for a transcript of the audio data to not reveal an identity of the respective participant;
- processing the plurality of segments of the audio data to generate:
  - diarization results that include a corresponding speaker label assigned to each segment; and
  - the transcript for the audio data; and
- based on the diarization results and the privacy request, indexing the transcript to:
  - for each corresponding participant of the plurality of participants other than the respective participant associated with the privacy request, include a corresponding identifier revealing an identity of the corresponding participant for any portions of the transcript that were spoken by the corresponding participant; and
  - for the respective participant associated with the privacy request, include an obscured identifier so that the identity of the respective participant is not revealed for any portions of the transcript that were spoken by the respective participant.

2. The computer-implemented method of claim 1, wherein processing the plurality of segments of the audio data to generate the diarization results further comprises processing the image data to generate the diarization results.

3. The computer-implemented method of claim 1, wherein processing the plurality of segments of the audio data to generate the transcript further comprises processing the image data to generate the transcript.

4. The computer-implemented method of claim 1, wherein the operations further comprise transmitting the indexed transcript to a plurality of display devices, each display device of the plurality of display devices configured to display the indexed transcript.

5. The computer-implemented method of claim 4, wherein one of the plurality of display devices is associated with a first respective subset of the plurality of participants located in a first meeting room environment.

6. The computer-implemented method of claim 5, wherein the respective participant associated with the privacy request belongs to the first respective subset of the plurality of participants located in the first meeting room environment.

7. The computer-implemented method of claim 5, wherein another one of the plurality of display devices is associated with a second respective subset of the plurality of participants located in a second meeting room environment different from the first meeting room environment.

8. The computer-implemented method of claim 1, wherein:
- the transcript is in a first language; and
- the operations further comprise:
  - determining that one of the plurality of participants is a native speaker of a second language, the second language different than the first language; and
  - translating the transcript into the second language.

9. The computer-implemented method of claim 1, wherein the image data comprises high-definition video processed by the data processing hardware.

10. The computer-implemented method of claim 1, wherein the data processing hardware resides on a cloud computing environment.

11. A system comprising:
- data processing hardware; and
- memory hardware in communication with the data processing hardware, the memory hardware storing instructions that when executed on the data processing hardware cause the data processing hardware to perform operations comprising:
  - receiving an audio-visual signal comprising audio data and image data, the audio data corresponding to speech utterances from a plurality of participants in a speech environment and the image data representing faces of the plurality of participants in the speech environment;
  - receiving a privacy request associated a respective participant of the plurality of participants, the privacy request indicating that the respective participant opts for a transcript of the audio data to not reveal an identity of the respective participant;
  - processing the plurality of segments of the audio data to generate:
    - diarization results that include a corresponding speaker label assigned to each segment; and
    - the transcript for the audio data; and
  - based on the diarization results and the privacy request, indexing the transcript to:
    - for each corresponding participant of the plurality of participants other than the respective participant associated with the privacy request, include a corresponding identifier revealing an identity of the corresponding participant for any portions of the transcript that were spoken by the corresponding participant; and for the respective participant associated with the privacy request, include an obscured identifier so that the identity of the respective participant is not revealed for any portions of the transcript that were spoken by the respective participant.

12. The system of claim 11, wherein processing the plurality of segments of the audio data to generate the diarization results further comprises processing the image data to generate the diarization results.

13. The system of claim 11, wherein processing the plurality of segments of the audio data to generate the transcript further comprises processing the image data to generate the transcript.

14. The system of claim 11, wherein the operations further comprise transmitting the indexed transcript to a plurality of display devices, each display device of the plurality of display devices configured to display the indexed transcript.

15. The system of claim 14, wherein one of the plurality of display devices is associated with a first respective subset of the plurality of participants located in a first meeting room environment.

16. The system of claim 15, wherein the respective participant associated with the privacy request belongs to the first respective subset of the plurality of participants located in the first meeting room environment.

17. The system of claim 15, wherein another one of the plurality of display devices is associated with a second respective subset of the plurality of participants located in a second meeting room environment different from the first meeting room environment.

18. The system of claim 11, wherein:

the transcript is in a first language; and the operations further comprise:

determining that one of the plurality of participants is a native speaker of a second language, the second language different than the first language; and translating the transcript into the second language.

19. The system of claim 11, wherein the image data comprises high-definition video processed by the data processing hardware.

20. The system of claim 11, wherein the data processing hardware resides on a cloud computing environment.

* * * * *